(12) United States Patent
Rutkevičius et al.

(10) Patent No.: US 11,130,639 B2
(45) Date of Patent: Sep. 28, 2021

(54) MODULAR PULLEY FOR CONTINUOUS BELT CONVEYOR SYSTEM

(71) Applicant: ABB Schweiz AG, Baden (CH)

(72) Inventors: Marius Rutkevičius, Raleigh, NC (US); Darren D. Tremelling, Apex, NC (US); Jonah Kadoko, Mint Hill, NC (US); Sheng Zhong, Hillsborough, NC (US); Thomas E. Kuckhoff, Greenville, SC (US); Jack D. Tavernier, Jr., Simpsonville, SC (US); Nikolaus P. Zant, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/723,635

(22) Filed: Dec. 20, 2019

(65) Prior Publication Data

US 2021/0188564 A1 Jun. 24, 2021

(51) Int. Cl.
*B65G 39/04* (2006.01)
*F16H 55/48* (2006.01)
*B65G 39/07* (2006.01)
*B65G 23/04* (2006.01)

(52) U.S. Cl.
CPC ............ *B65G 39/04* (2013.01); *B65G 23/04* (2013.01); *B65G 39/07* (2013.01); *F16H 55/48* (2013.01); *B65G 2207/30* (2013.01)

(58) Field of Classification Search
CPC ......... B65G 23/04; B65G 39/04; F16H 55/40; F16H 55/46; F16H 55/48
USPC .......................... 198/835; 474/186, 196, 197
See application file for complete search history.

(56) References Cited

U.S. PATENT DOCUMENTS

| 2,736,205 | A | * | 2/1956 | Dunne, Jr. | F16H 55/46 198/842 |
| 2,933,935 | A | * | 4/1960 | Sterkel | F16H 55/49 474/174 |
| 3,140,621 | A | * | 7/1964 | Stone | F16H 55/36 474/187 |
| 3,559,782 | A | * | 2/1971 | Lesley | B21C 23/20 193/37 |
| 3,744,329 | A | | 7/1973 | Frank | |
| 3,771,843 | A | * | 11/1973 | Clasper | B62D 55/14 474/187 |

(Continued)

FOREIGN PATENT DOCUMENTS

| JP | 2011-246786 A | 5/2013 |
| KR | 20-473156 Y1 | 6/2014 |

(Continued)

*Primary Examiner* — Joseph A Dillon, Jr.
(74) *Attorney, Agent, or Firm* — Leydig, Voit & Mayer, Ltd.

(57) ABSTRACT

A modular pulley assembly for a continuous belt conveyor can be assembly from a plurality of modular pulley disks that can be axially aligned and abut against each other to provide pulleys of differing lengths per demand. The modular pulley disks can be made from a non-metallic material such as a polymer and can manufactured by a suitable molding process. Making the modular pulley disks from non-metallic materials enables the disks to be formed with structural geometries such that the assembled pulley is structurally more rigid and can better distribute torsional loads and momentum from the belt to the support shaft.

14 Claims, 12 Drawing Sheets

(56) References Cited

U.S. PATENT DOCUMENTS

| | | | | |
|---|---|---|---|---|
| 3,854,576 | A | * | 12/1974 | Bowman ............... B65G 47/268 198/835 |
| 3,888,131 | A | | 6/1975 | Reid |
| 4,193,310 | A | * | 3/1980 | Boyer .................... D06F 58/08 474/91 |
| 4,233,853 | A | | 11/1980 | Holz |
| 4,413,981 | A | * | 11/1983 | White .................... F16H 55/50 474/175 |
| 4,946,427 | A | * | 8/1990 | Rampe .................. F16H 7/023 29/892 |
| 5,368,525 | A | | 11/1994 | Funahashi |
| 5,628,393 | A | * | 5/1997 | Steeber ................. B65G 15/62 198/699.1 |
| 5,655,642 | A | * | 8/1997 | Lawrence ............. B65G 39/04 193/37 |
| 5,833,562 | A | * | 11/1998 | Walker, Sr. ............ F16H 55/30 474/96 |
| 6,012,998 | A | | 1/2000 | Schutz et al. |
| 8,196,738 | B1 | | 6/2012 | Wolf et al. |
| 8,579,774 | B2 | | 11/2013 | Derscheid |
| 10,017,328 | B1 | | 7/2018 | Wolf et al. |
| 10,087,015 | B2 | * | 10/2018 | Xu ......................... B65G 13/02 |
| 2002/0108841 | A1 | * | 8/2002 | Roessler ............... B65G 21/105 198/835 |
| 2005/0192146 | A1 | * | 9/2005 | Marten-Perolino ..... B61B 12/10 474/176 |
| 2008/0090687 | A1 | * | 4/2008 | Eck .................... B29C 45/14491 474/199 |
| 2010/0252393 | A1 | * | 10/2010 | Chen ..................... B65G 39/04 193/37 |
| 2010/0273592 | A1 | * | 10/2010 | Curley .................. F16H 55/12 474/152 |
| 2012/0037479 | A1 | * | 2/2012 | Lucchi .................. B65G 23/06 198/835 |
| 2014/0166443 | A1 | * | 6/2014 | Shinobu ................ B65G 17/24 198/779 |
| 2014/0194237 | A1 | * | 7/2014 | Wolf ...................... F16H 55/36 474/166 |
| 2016/0130092 | A1 | * | 5/2016 | Rudolph ................ B65G 39/07 198/842 |
| 2017/0314637 | A1 | * | 11/2017 | Manzoor .............. F16F 15/1442 |
| 2019/0186611 | A1 | * | 6/2019 | Kinoshita ............ F16F 15/126 |
| 2020/0088271 | A1 | * | 3/2020 | Wade .................... F16H 55/40 |

FOREIGN PATENT DOCUMENTS

| | | |
|---|---|---|
| WO | WO 2016/161473 A1 | 10/2016 |
| WO | WO 2018/181152 A1 | 10/2018 |

* cited by examiner

MODULAR PULLEY FOR CONTINUOUS BELT CONVEYOR SYSTEM

BACKGROUND

Continuous conveyor systems are used to convey materials over a distance between loading point and a discharge point. Such conveyor systems may be used in mining, agriculture, and large-scale manufacturing and may transport bulk materials such as mining aggregates and ores, raw processing materials, and other types of materials. Belt conveyor systems typically include an elongated and flexible belt, for example, of rubber or similar material that is joined to itself to form a continuous loop. The continuous belt is extended along and supported by a plurality of rollers or pulleys. The rollers and pulleys are typically cylindrical or may have a similar shape and are disposed across the width of the continuous belt traverse to the direction of travel. Pulleys may be the elements that conveyor belts are partially wrapped around for redirection and/or tracking of the belt. For example, the pulleys may be made as hollow drums of tubular steel welded to end plates to reduce weight and maintain continuous contact with the belt. The continuous belt is driven to translate with respect to the pulleys and thereby carries the materials between the loading and discharge points, which may be a considerable distance apart and may include changes in direction or elevation. The pulleys are typically supported to rotate to carry the passing belt and may be of various different types and configurations depending on their function and location in the belt conveyor system. For example, to drive the belt, a drive pulley operatively coupled to an electric motor or other power source is included at one end of the conveyor system with the continuous belt partially wrapped around it. When the drive pulley is rotated by an applied force, friction between the curvilinear surface of the drive pulley and the continuous belt wrapped around it results in translational movement of the belt. Another pulley may be a tail or return pulley located at the opposite end of the conveyor system that the continuous belt is partially wrapped around for redirection back toward the drive pulley. Idler pulleys may be located between the drive and return pulleys to support the belt and take-up pulleys may be used to remove slack and increase tension in the belt. The present disclosure is directed to the construction and operation of pulleys for belt conveyor systems of the foregoing type.

BRIEF SUMMARY

The disclosure provides a modular pulley assembly for a belt conveyor system. The modular pulley system can include a plurality of cylindrical modular pulley disks that can be stacked axially adjacent to each other in an abutting manner to form a cylindrical body having a curvilinear surface that can make contact with the belt during operation. The number of disks can be selected to provide a pulley assembly of any desired length to accommodate a range of different belt widths. The adjacent modular pulley disks can be interlocked or meshed together to prevent relative rotation between the disks and to hold the cylindrical body of the modular pulley assembly together. The individual modular pulley disks can be made from a non-metallic material such as a polymer to reduce weight and to enable fabrication of cross-sectional geometries for the disk to distribute loads from the conveyor belt to a support shaft on which the modular pulley assembly may be mounted. In an example, the modular pulley assembly may include a pulley lagging disposed about its outer circumferential surface to increase frictional contact with the belt. A possible advantage of the disclosure is that the modular pulley assembly can be readily configured to any desired length in the field and is sufficiently structurally rigidity to resist distortion or displacement with respect to the axis line and maintain proper belt tracking. This and other possible advantages and features will be apparent from the following detailed description and accompanying drawings.

DETAILED DESCRIPTION

Figure 1:
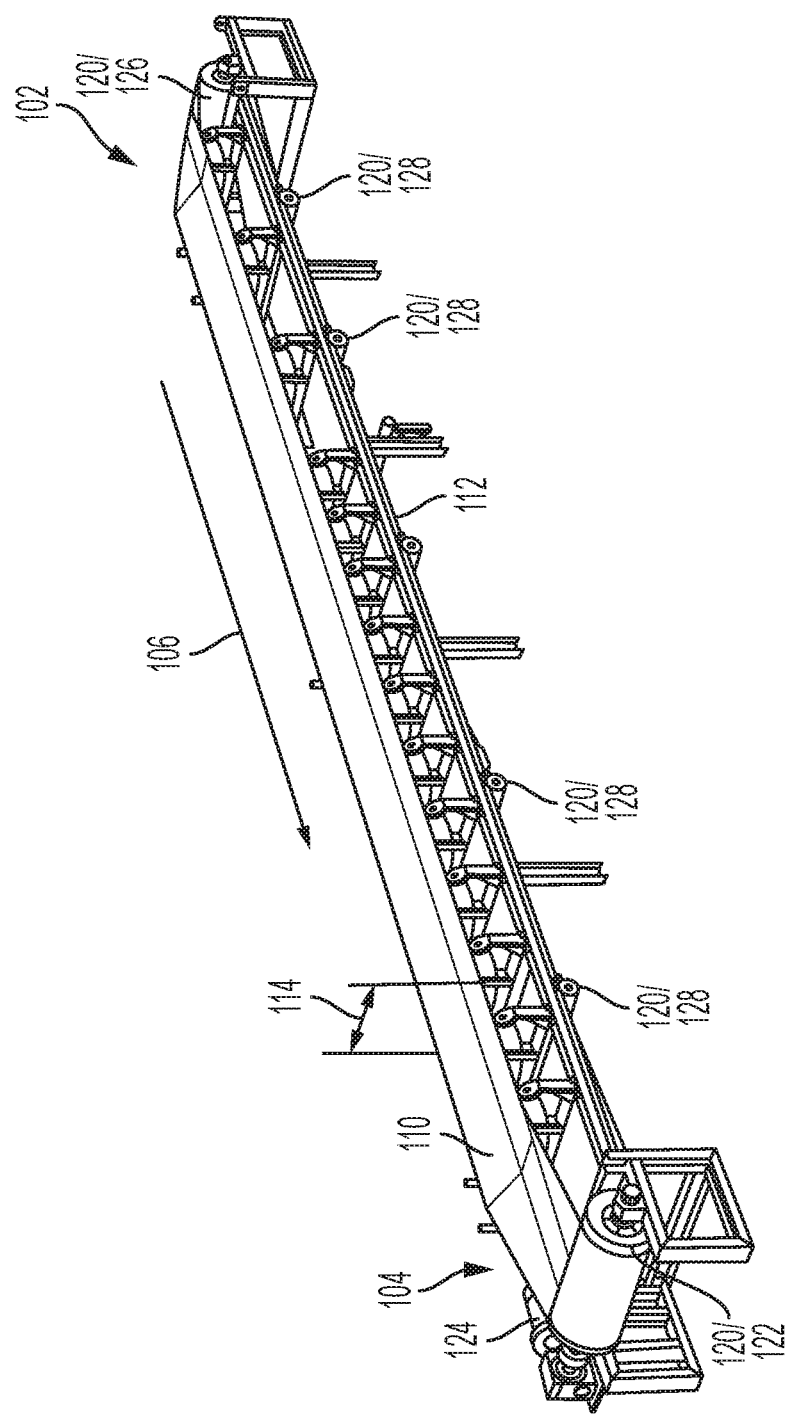
FIG. 1 is a perspective view of a continuous belt conveyor system for the transportation of bulk materials between loading and discharge points that includes a flexible belt disposed about a plurality of pulleys and rollers.

Now referring to the drawings, wherein like reference numbers refer to like elements, there is illustrated in FIG. 1 an example of a large scale belt conveyor system 100 for the transportation of bulk materials over a distance from a loading point 102 to a discharge point 104. The distance between the loading point 102 and discharge point 102 may be considerable and may be on the order of hundreds of meters or larger. Belt conveyor systems 100 designed for covering such distances may be referred to as overland conveyor systems. The direction between the loading point 102 and the discharge point 104 may be referred to as the travel direction 106 and may include inclines, declines, and curves. The conveyor system 100 includes an elongated, flexible belt 110 attached to itself to form a closed, continuous loop that is supported by and can translate with respect to a frame 112 that includes the fixed structural components located between the loading and discharge points 102, 104. The belt 110 may be a flat belt with opposing planar surfaces and have a substantial belt width 114 traverse to its elongated direction to support the material being transported. The belt 110 may also be a toothed belt or include additional traction inducing mechanisms. The belt 110, while typically made of a flexible material, may be made from a plurality of laminated layers and may include steel cords or the like for strength. When disposed over the frame 112, the belt 110 is held in tension between the loading and discharge points 102, 104 and provides a planar surface moving in the travel direction 106 onto which the material may be deposited and carried. As a closed loop, the belt can be redirected at the discharge point 104 and returned to the loading point 102 in continuous circulation. The material may held at rest on the belt 110 by gravity. In some cases, to reduce or avoid spillage, the flat belt 110 may be shaped into a trough by curving its width 114 along the run between the loading and discharge points 102, 104.

To support and carry the continuous belt 110, a plurality of rotatable pulleys 120 and/or rollers are included at different locations over the length the frame 112. The pulleys 120 are elongated cylindrical structures that are oriented traverse to the travel direction 106 of the belt 110 so that it passes across the pulley 120. Pulleys 120 may be provided in varies types, sizes and configurations. For example, to drive the belt 110, a drive pulley 122 can be included at the discharge point 104 and which is operatively associated with an electric motor 124 for powering rotation. When the drive pulley 122 is rotated, the belt 110 that is partially disposed or wrapped around the drive pulley will be pulled by traction arising from the frictional forces between their respective surfaces. It will be appreciated that the larger the contact area between the belt 110 and drive pulley 122, measured across the belt width 114 and the angular contact or wrap around the circumference of the drive pulley, will increase the amount of traction and force imparted to the belt. Located at the loading point 102 at the opposite end of the conveyor system 100 is a tail or return pulley 126 that redirects the continuous looped belt 110 back to the discharge point 104. To support and direct the belt 110, idler pulleys 128 can be located along the length of the frame 112 which are typically unpowered and are driven by the belt. Other examples of pulleys 120 include take-up pulleys for reducing belt slack, snub pulleys, and others.

Figure 2:
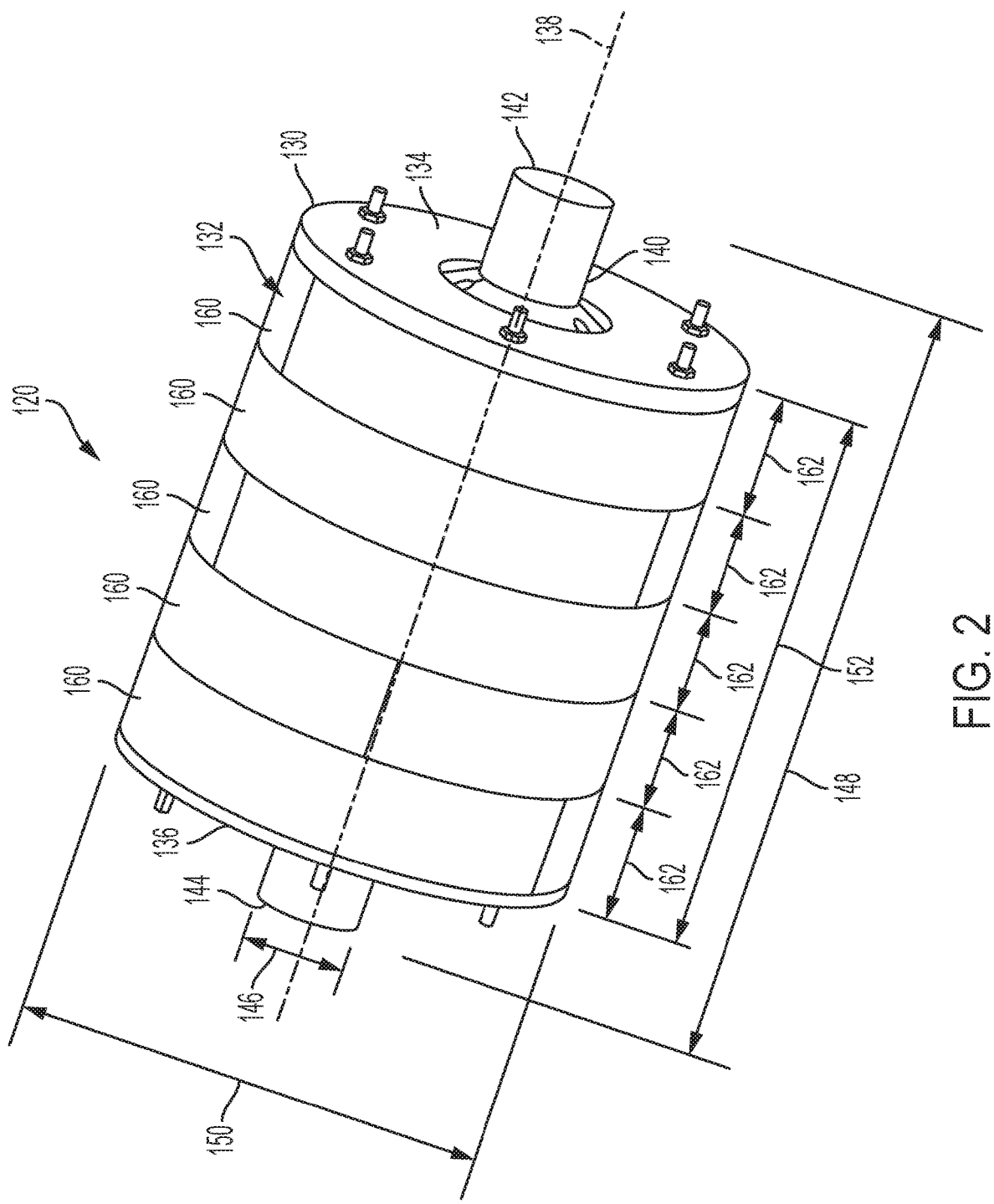
FIG. 2 is a perspective view of an example of a modular pulley assembly assembled from a plurality of modular pulley disks coaxially arranged and rotatably secured together in accordance with the disclosure.

Referring to FIG. 2, there is illustrated an example of a pulley 120 assembled in accordance with the disclosure. The pulley 120 may be configured as a drive pulley, although aspects of the disclosure may be applicable to other types of pulleys utilized with belt conveyor systems. The pulley 120 includes a generally cylindrical body 130 with a curved or curvilinear surface 132 that extends between a first pulley end 134 and an opposing second pulley end 136. The shape of the cylindrical body 130 may define an axis line 138 that may be the radial center of the curvilinear surface 132 and that extends normally through the first and second pulley ends 134, 136. The axis line 138 corresponds to the axis of rotation when the pulley 120 is rotated. In the illustrated example, the curvilinear surface 132 of the cylindrical body 130 may be level or smooth so that the pulley 120 is a drum pulley configured for continuous contact with the belt. However, in other examples, the curvilinear surface 132 may include radially projecting wings or fins that provide voids between themselves to allow loose material and debris to fall through. Moreover, while the profile of the curvilinear surface 132 between the first and second pulley ends 134, 136 is flat and precisely cylindrical, in other examples, the profile of the curvilinear surface 132 may be crowned and have slightly varying diameters at different axial locations between the first and second pulley ends 134, 136 to improve belt tracking.

To rotatably support the pulley 120, a support shaft 140 can be aligned with the axis line 138 and is therefore coaxial with the curvilinear surface 132. The support shaft 140 can include a first shaft end 142 projecting normally from the first pulley end 134 and a second shaft end 144 projecting normally from the second pulley end 136 respectively. The support shaft 140 can be a continuous shaft that extends continuously from the first shaft end 142 through the cylindrical body 130 to the second shaft end 144. Alternatively, the support shaft 140 may be a stub shaft in which the first and second shaft ends 142, 144 are fixed to the first and second pulley ends 134, 136 respectively and do not extend through the cylindrical body 130. The support shaft 140 including the first and second shaft ends 142, 144 may be cylindrical in cross-section similar to the cylindrical body 130, but in other examples, they may have other suitable shapes such as various polygons. The support shaft 140 may have a shaft diameter 146 that is significantly smaller than or reduced compared to a pulley diameter 150 associated with the curvilinear surface 132 of the cylindrical body 130. By way of example, the pulley diameter may be in the range of four to sixty inches, though diameters will vary by application. In addition, the cylindrical body 130 may define a pulley width 152 between the first and second pulley ends 134, 136 that may be shorter than a corresponding shaft length 148 between the first and second shaft ends 142, 144. By way of example, the pulley width 152 or face may be in the range of twelve inches to sixty-six inches.

Figure 3:
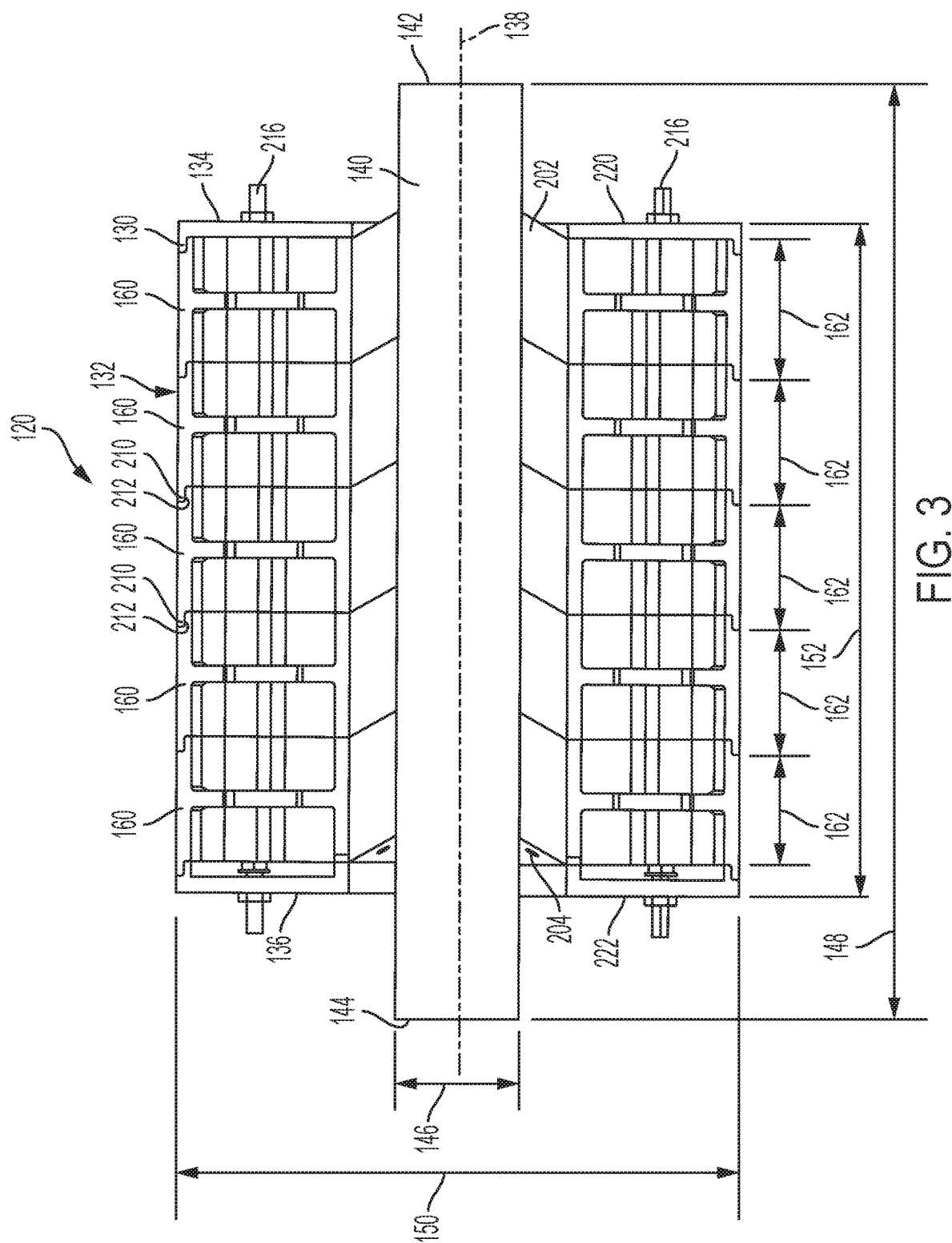
FIG. 3 is a cross-sectional view of the modular pulley assembly showing the plurality of modular pulley disks coaxially arranged with respect to a support shaft.

Referring to FIGS. 2 and 3, to provide pulleys 120 in varying pulley widths 152, the cylindrical body 130 may be assembled from a plurality of modular pulley disks 160. Each modular pulley disk 160 can be flat and disc-like in shape and may each have a diameter coextensive with the pulley diameter 150 of the curvilinear surface 132. The plurality of modular pulley disks 160 can be coaxially aligned with respect to the axis line 138 and can be disposed in an axially adjacent arrangement in which the plurality of disks are in physically abutting contact with an respective adjacent disk. The cylindrical body 130 therefore corresponds to an axially aligned stack of modular pulley disks 160, i.e., a disk stack. Each of the modular pulley disks 160 can have an associated disk width 162 established with reference to the axial direction such that the overall pulley width 152 can be adjusted by increasing or reducing the number of individual disks in the plurality included in the cylindrical body 130. A possible advantage of assembling the pulleys from individual modular pulley disks is that the disks can be aligned and connected to provide pulleys of any desired pulley width 152. The modular pulley disks 160 can be readily stocked by a conveyor manufacturers or by an end user such that pulleys can be custom assembled on demand and in the field.

The modular pulley disks 160 may be made from a non-metallic material such as a polymer including thermoset or thermoplastic polymers, elastomers, ceramics, or combinations thereof. Examples of possible non-metallic materials include epoxies and phenolics. The non-metallic material of the modular pulley disks 160 may be a composite and include glass fibers or beads, carbon fibers or beads, boron fibers or beads, or other strengthening materials. The modular pulley disk 160 of non-metallic material can be manufactured by any suitable process including injection molding, melting and casting, compression molding, thermoforming, and other suitable processes. The modular pulley disks 160 may be physically identical, although in other examples, they may vary in width or the non-metallic material used.

Figure 4:
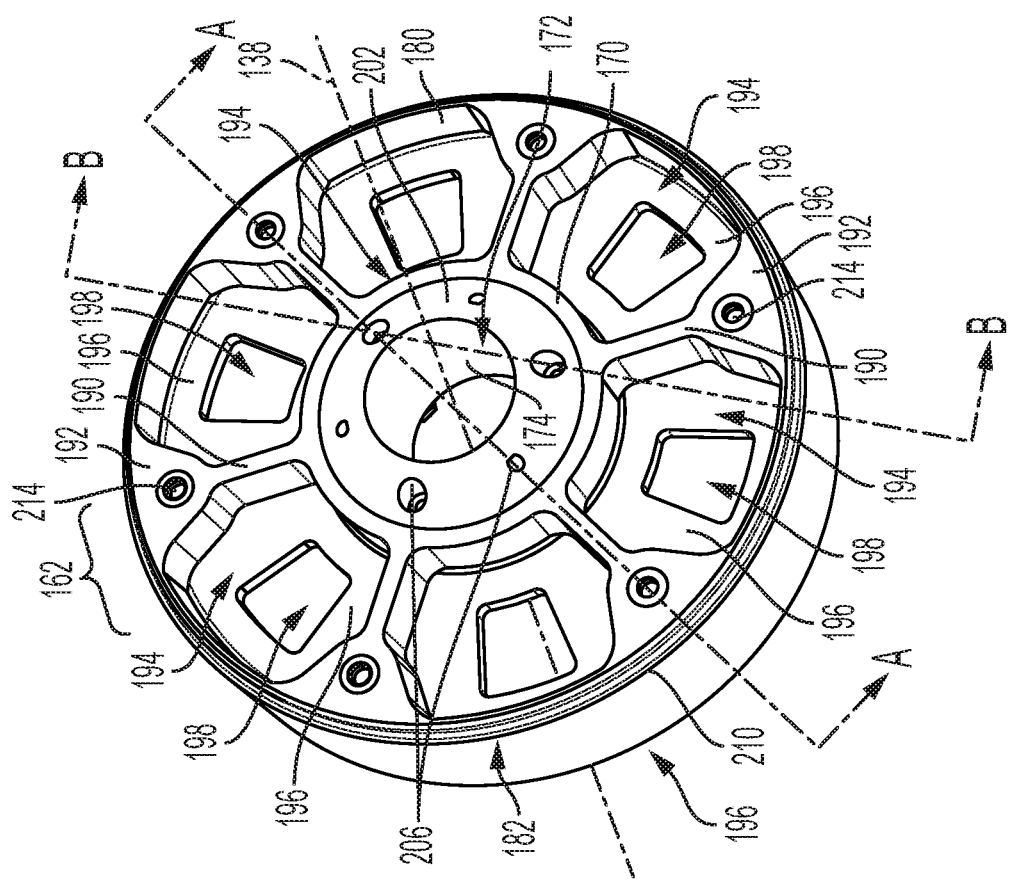
FIG. 4 is a front perspective view of an example of the modular pulley disk in accordance with the disclosure.
Figure 5:
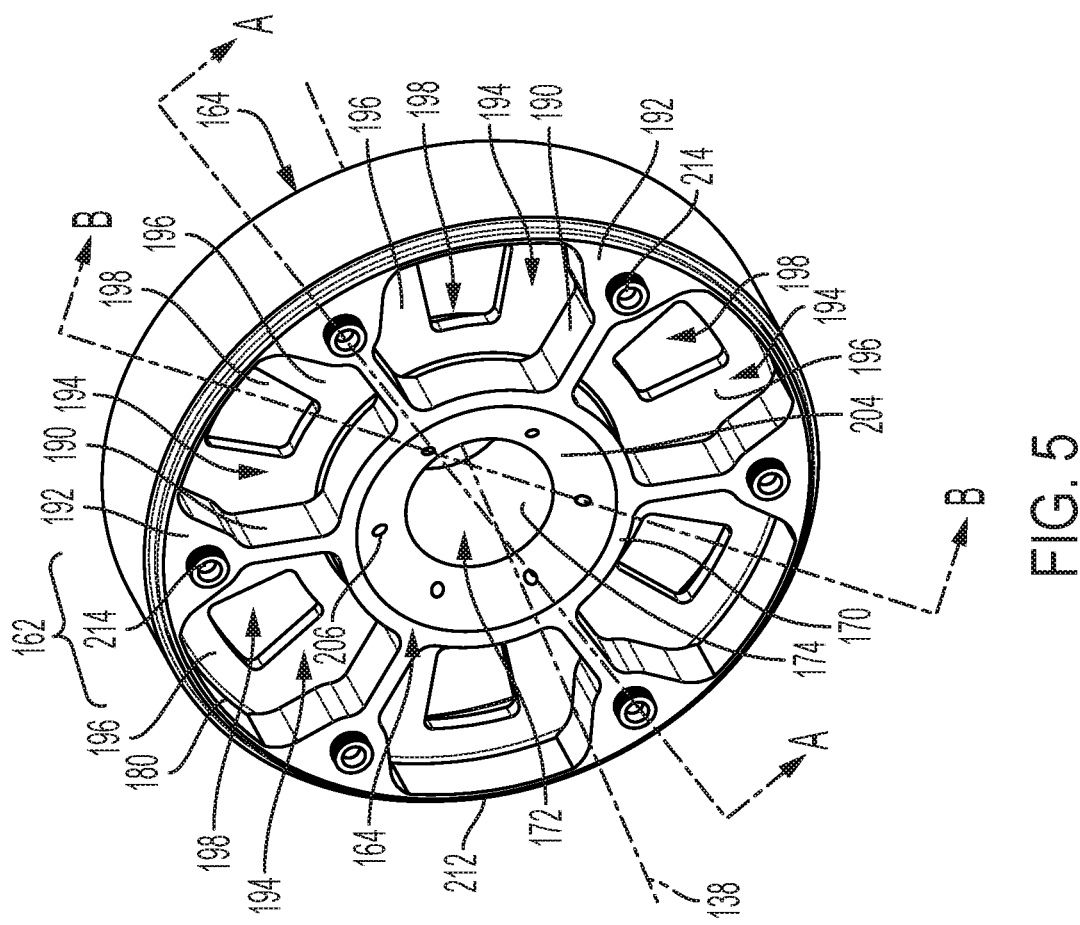
FIG. 5 is a rear perspective view of the modular pulley disk of FIG. 4.
Figure 6:
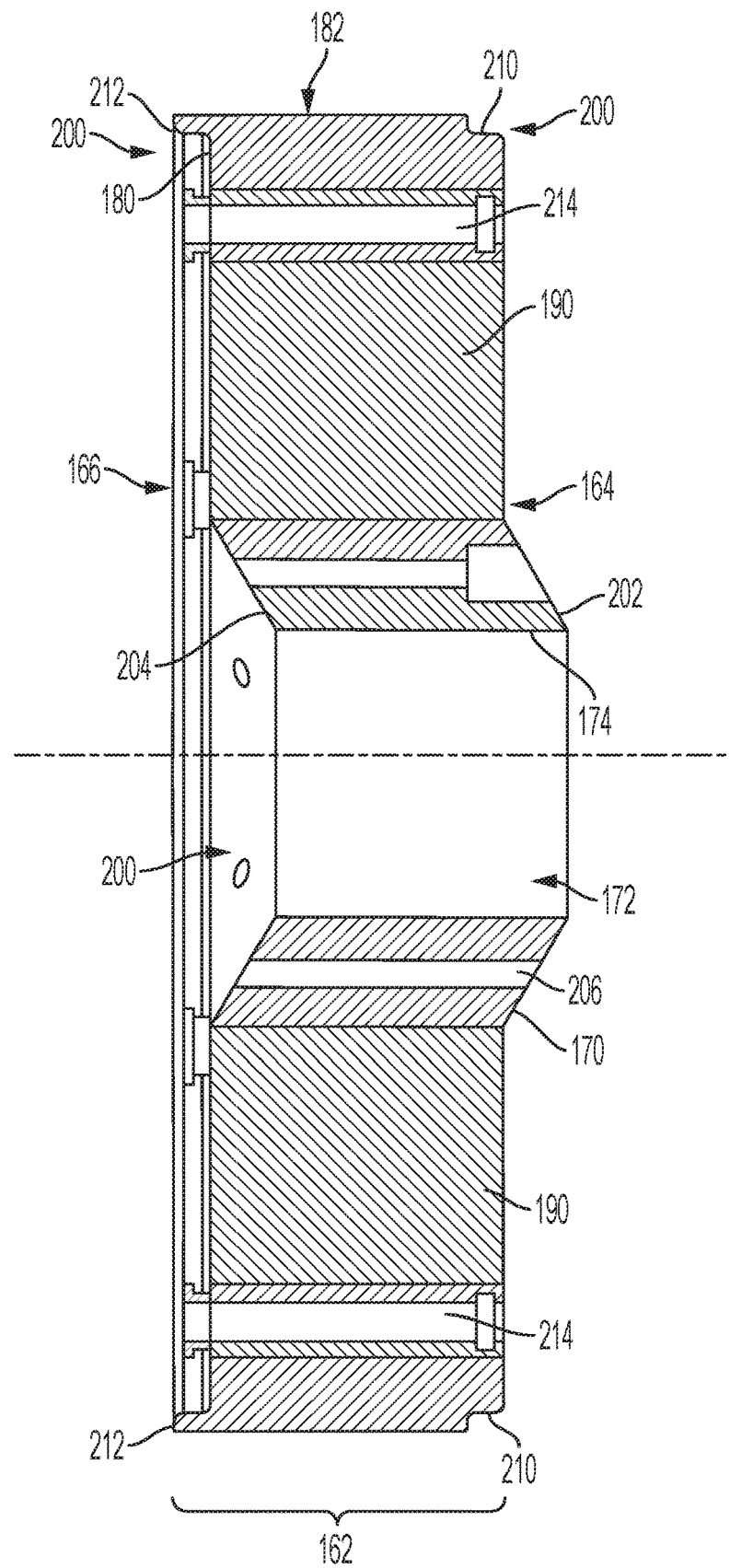
FIG. 6 is a cross-sectional view of the modular pulley disk taken along line A-A through the support spokes interconnecting the central hub and the outer rim.
Figure 7:
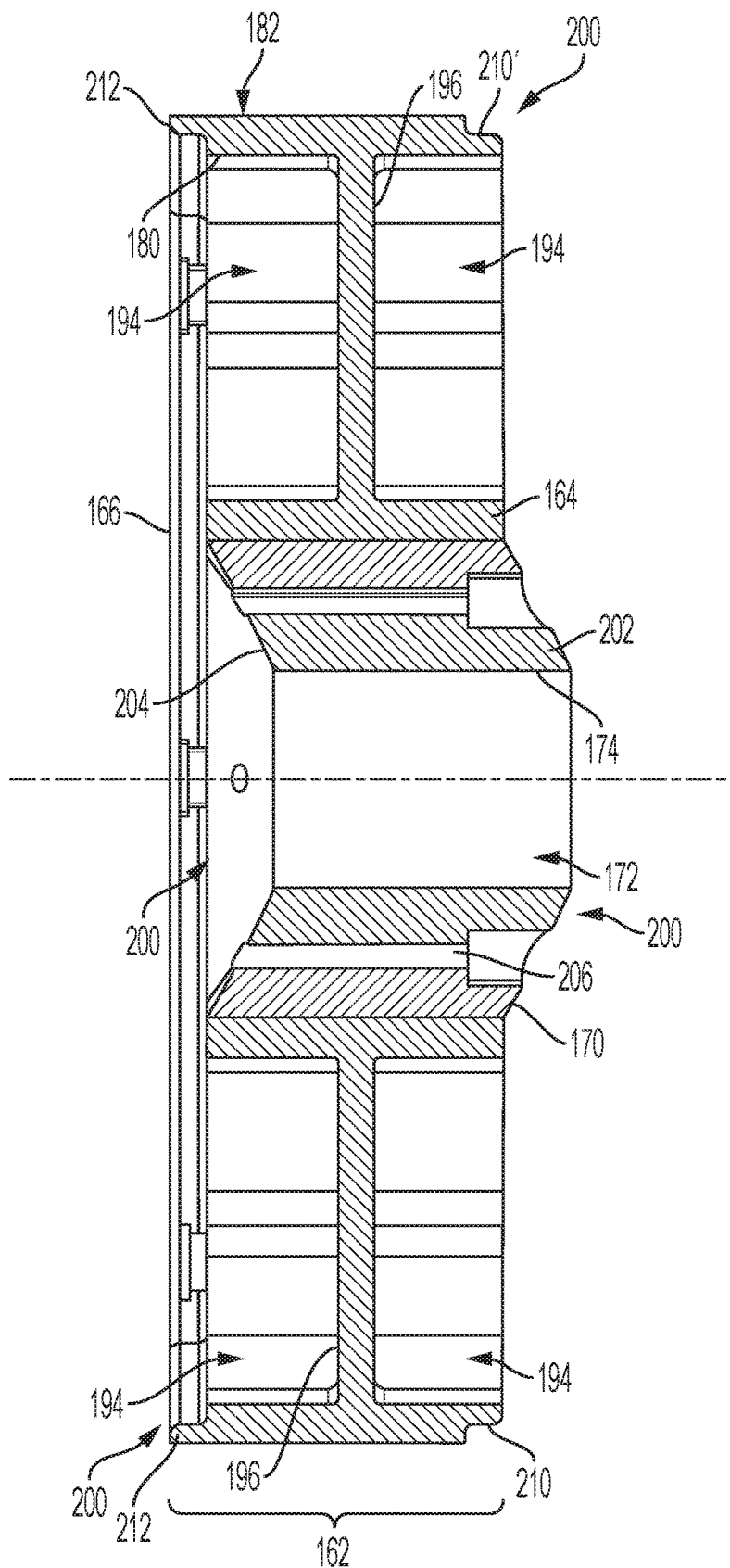
FIG. 7 is a cross-sectional view of the modular pulley disk taken along line B-B. through the cavities disposed between the support spokes.

Referring to FIGS. 4 and 5, there is an example of a modular pulley disk 160 that corresponds to an axial segment or portion of the overall pulley length and defines a disk width 162 that extends between a first axial face 164 and a parallel, opposite second axial face 166. By way of example, the disk width 162 may be of an inch to a few inches to allow multiple modular pulley disks 160 to be assembled together per to arrive at the desired pulley width 152. In an example, the modular pulley disks 160 may be provided in different sized disk widths 162 that can be intended for different axial positions along the length of the support shaft. According, high loads transferred through the modular pulley assembly and the support shaft may be compensated for by placing modular pulley disks of larger widths towards the axial ends of the assembly and narrower disks toward the center. The elevated loads occurring at the axial ends of the support shaft are countered by the support and/or rigidity provided by the wider modular pulley disks that surround the shaft at those locations. By way of example, the pulley may be able to transfer loads in the range of approximately 30 to 800 pounds per inch width.

Each modular pulley disk 160 may be manufactured from non-metallic material such as molded polymer. Molding of the non-metallic material enables the structure of the modular pulley disk 160 to be shaped or configured to advantageously transfer forces and momentum between the shaft and belt during operation while possibly reducing the material and weight of the pulley. For example, while the modular pulley disk 160 in some configurations can have a solid puck-like structure, in other configurations, the structure can be more complex to provide material and weight improvement while maintaining structural rigidity. In the illustrated example, to accommodate and engage a continuous shaft that may correspond to the support shaft, the modular pulley disk 160 can include a central hub 170 that may be a generally annular in shape with a shaft bore 172 centrally disposed there through. The shaft bore 172 may have a shape and dimensions to receive the support shaft in the examples that utilize a continuous shaft. When assembled as part of the pulley, the annular shaped central hub 170 will concentrically align with the axis line 138. In those embodiments that utilize stub shafts, the central hub may be omitted or may have other configurations.

To lock the modular pulley assembly 160 in rotation with a continuous shaft, the central hub 170 may be configured with apertures to accommodate setscrews or the shaft bore 172 may have an axial slot disposed in the internal bore surface 174 that can function as a key seat for accommodating a key projecting from the shaft. In another example, the central hub 170 and the shaft bore 172 therein may form a keyless locking connection with the support shaft. In such an example, the internal bore surface 174 may include an elastomeric material having a reduced diameter compared to the support shaft and that can be resiliently deformed during insertion of the support shaft into the shaft bore 172. The resilient characteristic associated with the elastomeric material forcibly urges against and clamps around the support shaft thereby providing an interference fit locking the components together. The elastomeric material at the internal bore surface 174 may be deposited there by multi-shot molding process during fabrication of the central hub 170 or by an over-molding process after formation of the main structure of the central hub. In another example, the central portion of the central hub 170 delineating the internal bore surface 174 may include a keyless bushing that can be radially clamped around the support shaft after insertion through the shaft bore 172. The keyless bushing can be the same or a different material as the central hub 170 and can be integrally incorporated by an over-molding or press fit process. In an embodiment, the keyless bushing or a similar element can be made of metal and over-molded with the non-metallic material of the modular pulley disk so that the bushing functions as the contact surface with the support shaft. The inner diameter of the metal bushing can be machined to provide different sliding or interference fits with the shaft and different designs of bushings can be installed.

A possible advantage of manufacturing the modular pulley disk 160 form a non-metallic material such as a polymer is that the central hub 170 can be configured to engage with different support shafts. For example, by utilizing different mold inserts, the same mold can be used to shaped shaft bores 172 in different diameters or having different profiles. Also different fits between the shaft bores 172 and supports, such as tapered interference fits, sliding fits, and the like, can be readily formed.

To physically contact and move the belt, the modular pulley disk 160 can include an circular outer rim 180 that is concentrically disposed around and radially outward of the central hub 170. The outer rim 180 can be structured as a thin-walled annulus that extends between and is perpendicular to the first axial face 164 and the second axial face 166 of the modular pulley disk 160. The size and configuration of the outer rim 180 can be designed to accommodate the hoop stresses and circumferential stresses imparted to the modular pulley disk 160 during operation. The outer rim 180 can include, at the radially outermost extension, a peripheral rim surface 182 that can correspond to the curvilinear surface of the pulley and that can have a diameter corresponding to the pulley diameter. The peripheral rim surface 182 may be smooth to provide a flat, circumferential profile about the modular pulley disk 160, although in other examples, it may be knurled or have other friction enhancing features to improve traction with the belt.

To interconnect the smaller diameter central hub 170 and the larger diameter outer rim 180, the modular pulley disk 160 can include a plurality of radial support spokes 190 extending between the central hub to the outer rim. The support spokes 190 can be flat, solid structures of rectangular cross-section and that are disposed between the first and second axial faces 164, 165 to correspond to disk width 162. The profile and arrangement of the support spokes 190 in the modular pulley disk 160 can enable the spokes to transmit compressive loads and torsional forces and momentum between the central hub 170 and outer rim 180 while rigidly supporting the concentric arrangement of the central hub and the outer rim. To distribute force transfer between the support spokes 190 and the outer rim 180, the support spokes and the outer rim may form reinforcement nodes 192 at their joinder that provides a bulkier structural connection. Located between the support spokes 190 and radially spacing them apart are cavities 194 that serve to remove material from the modular pulley disk 160 and reduce its weight. Because of the cavities 194 between the support spokes 190, the cylindrical body 130 of the pulley 120 assembled from a plurality of similar modular pulley disks 160 may be substantially hollow and relatively light weight. A thin-walled web 196 may extend across the cavities 194 angularly interconnecting adjacent support spokes 190 to provide additional bracing and structural rigidity. The thin-walled web 196 can be oriented in an axial plane of the modular pulley disk 160 mid-width between the first axial face 164 and the second axial face 166. One or more windows 198 may be disposed in the thin-walled web 196 for further weight reduction.

Referring to FIGS. 4-7, to better distribute the forces and/or torque transferred through the disk stack corresponding to the cylindrical body, the plurality of modular pulley disks 160 can be interlocked and meshed together to prevent relative rotation between individual disks and the support shaft. The modular pulley disks 160 may include complementary interlocking engagement structures 200 or features proximate to the first and second axial faces 164, 166 to interlock or mesh adjacent disks together. For example, the central hub 170 of each modular pulley disk 160 can include a male protrusion 202 that projects a short axial distance from the first axial face 164. The male protrusion 202 can be frustoconical in shape and may be concentrically disposed around and tapering towards the shaft bore 172. The base of the frustoconical male protrusion 202 may correspond to the diameter of the central hub 170. To interface with the male protrusion 170, a female recess 204 complementary in shape and dimension can be disposed into the central hub 170 axially inward from the second axial face 166. The female recess 204 may also be frustoconical in shape and concentric to the shaft bore 172. A plurality of fastener holes 206, parallel to the axis line 138 and radially arranged, can be disposed into the material of the central hub 170 from the male protrusion 202 to the female recess 204. When first and second modular pulley disks 160 are adjacently placed with the first axial face 164 and second axial face 166 in opposing contact as shown in FIG. 3, the male protrusion 202 can be received in and mate with the female recess 204 thereby coaxially aligning the first and second disks. Fasteners or dowel rods can be inserted through aligned fastener holes 206 to securely interlock the adjacent modular pulley disks 160 in coupled rotation together. As can be appreciated from FIG. 3, the series of the mated male protrusions 202 and the female recesses 204 extend along a substantial portion of the length of the support shaft 140 to enhance the connection between the cylindrical body 130 and the support shaft, enabling a stiffer pulley assembly, allowing dispersal of loads over the length of the support shaft, and improved resistance to bending loads due to continuous axial contact between the support shaft and modular pulley disks 160.

In another example, the complementary interlocking engagement structure 200 to mesh adjacent modular pulley disks 160 can be located at the outer rims 180 to the disks. The peripheral rim surface 182 of the outer rim 180 can have a circular rabbet 210 disposed therein proximate to the intersection with the first axial face 164. The rabbet 210 may be a shallow groove in the peripheral rim surface 182 that circumferentially encircles the axis line 138. To form a lap joint with the rabbet 210, a complementary lip flange 212 can be included on the outer rim 180 at the intersection of the peripheral rim surface 182 and the second axial face 166. The rabbet 210 and the lip flange 212 can be of the same diameter and be similar in shape and dimension. When first and second modular pulley disks 160 are adjacently placed with the first and second axial faces 164, 166 in opposing contact as shown in FIG. 3, the rabbet 210 of the first disk can receive the concentric lip flange 212 of the second disk to coaxially align the two. To couple adjacent modular pulley disks 160 together in rotation, a plurality of tie rods can be used. Disposed through each modular disk assembly 160 proximate to where the outer rim 180 and the support spoke 190 join can be a rod hole 214 parallel to the axis line 138 extending between the first and second axial faces 164, 166. When a plurality of modular pulley disks 160 are axially stacked together, elongated tie rods 216 can be inserted through the aligned rod holes 214 to extend across the pulley width 152 associated with the pulley 120 to rotatably couple the adjacent modular pulley disks together.

Figure 8:
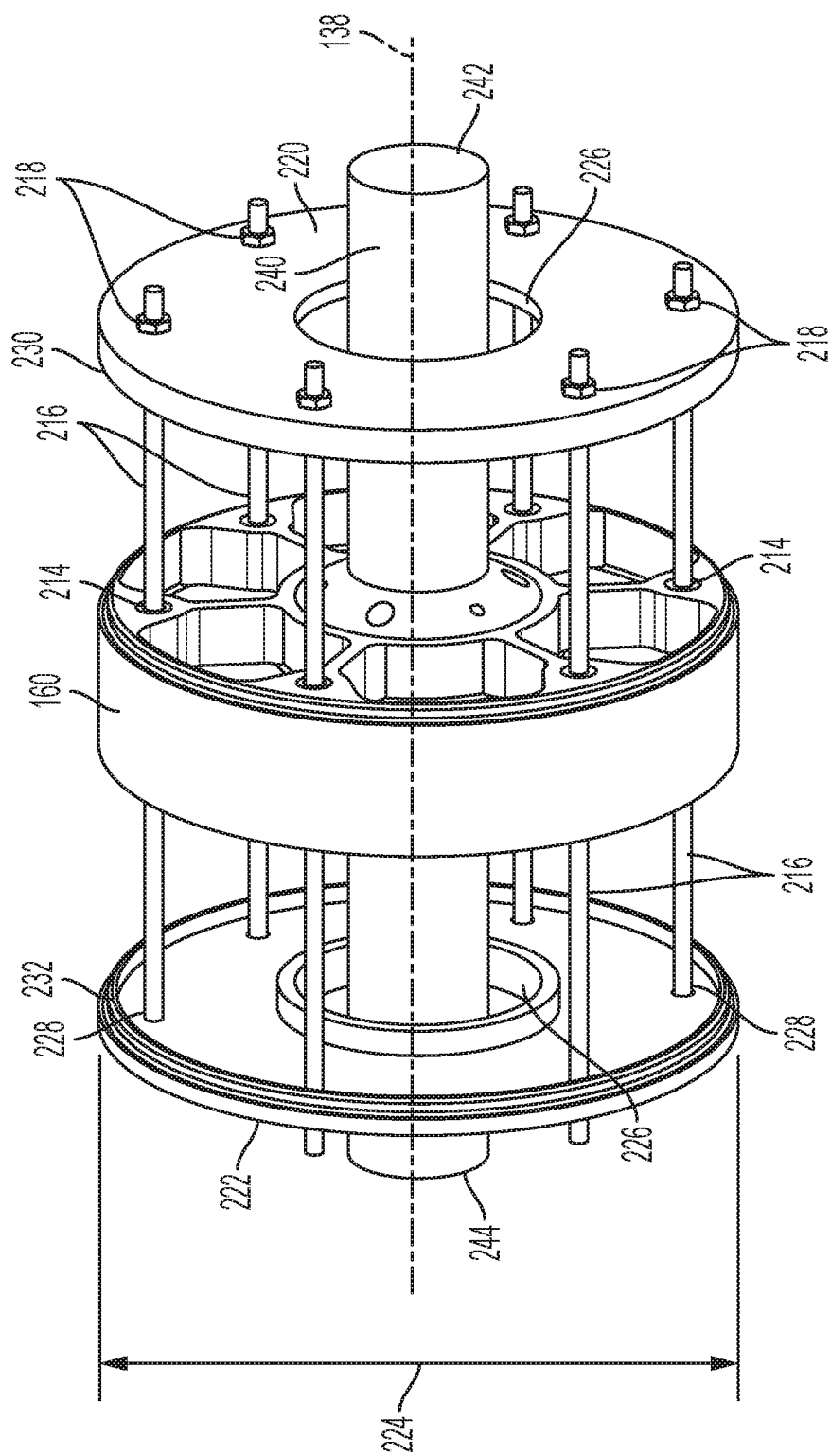
FIG. 8 is a perspective view of one of the plurality of the modular pulley disks in coaxially arrangement with respect to first and second end plates.

Referring to FIGS. 3 and 8 in a further example of the disclosure, to axially compress the disk stack corresponding to the cylindrical body 130 together, the tie rods 216 can operate in conjunction with a first end plate 220 and a second end plate 222. The first and second end plates 220, 222 can have circular, planar shapes corresponding in plate diameter 224 to the pulley diameter 150 associated with the modular pulley disks 160. The first and second end plates 220, 222 can be manufactured from the same non-metallic material as the modular disks 160 or can be metallic for increased relative strength. If the support shaft 140 is a continuous shaft, the first and second end plates 220, 222 can each include a shaft aperture 226 for the first shaft end 142 and second shaft end 144 to protrude through. To secure the end plates 220, 222 to the continuous support shaft 140, the shaft apertures 226 may be dimensioned may be dimensioned to form a compression fit or interference fit with the shaft. If the support shaft 140 is configured as a stub shaft, the first and second shaft ends 142, 144 can be formed as an integral component of the first and second end plates 220, 222 respectively. The first and second end plates 220, 222 can also include a plurality of radially arranged rod holes 228 that correspond in alignment with the rod holes 214 disposed in the plurality of modular pulley disks 160. When assembled, the first end plate 220 is located adjacent to the first pulley end 134 of the cylindrical body 130 and the second end plate 222 is located at the second pulley end 136 of the cylindrical body. To concentrically align the first and second end plates 220, 222 with the plurality of modular pulley disks 160, the first end plate 220 can include a circular lip flange 230 and the second end plate 222 can include a circular rabbet 232 similar to those described above that concentrically engage with complementary features on an adjacent one of the plurality of modular pulley disks 160. The tie rods 216 can be axially inserted through the aligned rod apertures 228 of the first and second end plates 220, 222 and corresponding rod apertures 214 of the modular pulley disks 160. The protruding ends of the tie rods 216 can be threaded to fasten to a nut 218 or similar fastener. As the nuts 218 are fastened onto the tie rods 216 axially towards each other, the nuts assert a clamping force onto the first and second end plates 220, 222 placing the tie rods 216 in tension and exerting a reactive compressive force on the disk stack corresponding to the cylindrical body 130 in the axial direction parallel to the axis line 138. The resulting compressive force maintains the plurality of modular pulley disks 160 in the coaxially stacked relation and maintains the structural integrity of the cylindrical body 130 of the pulley 120.

Figure 9:
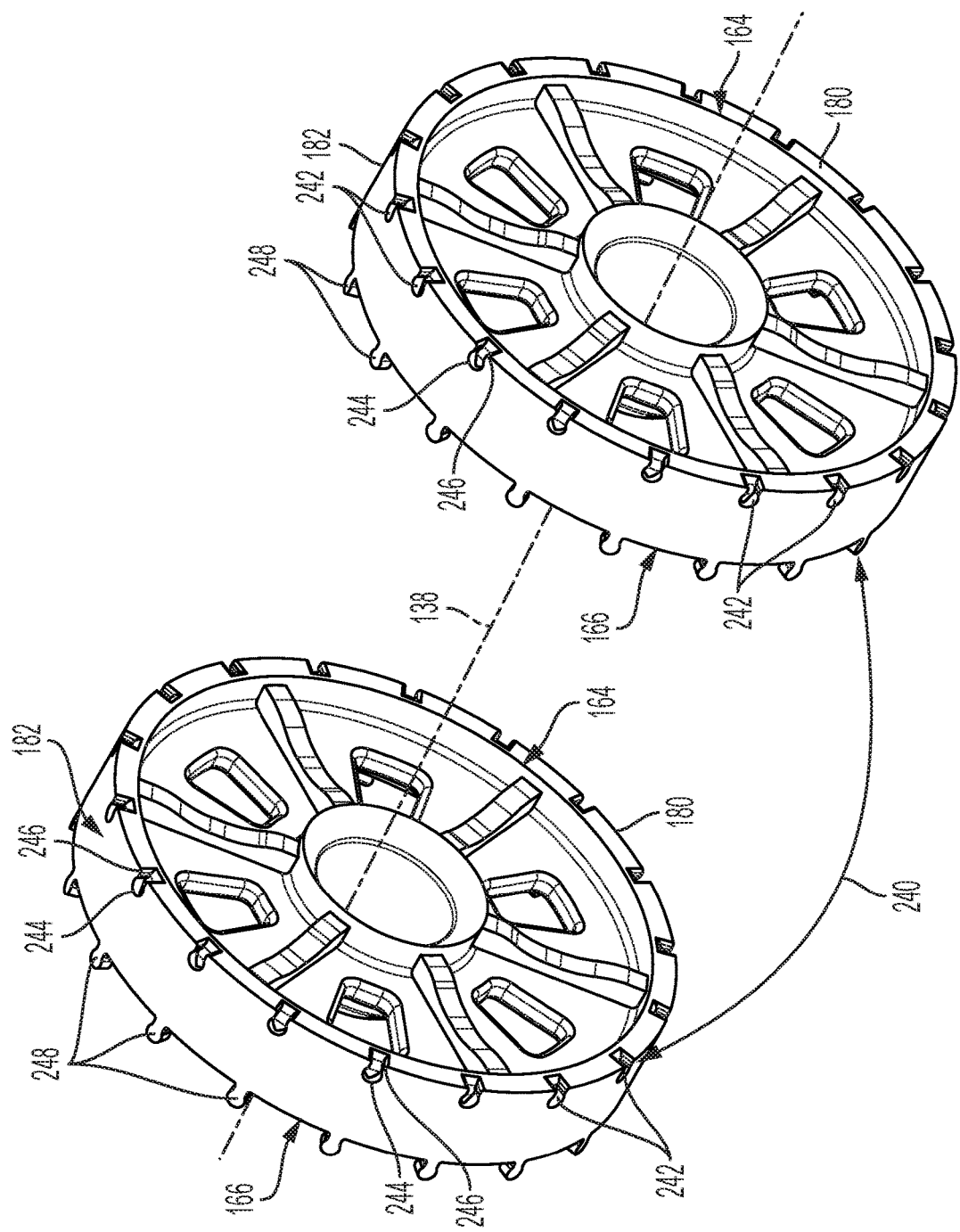
FIG. 9 is a perspective view of another example of two modular pulley disks having interconnection features included about their outer rims for rotatably securing the modular pulley disks together.

Referring to FIG. 9, there is illustrated another example of complementary interlocking engagement structures 200 to mesh and rotatably couple the plurality of modular pulley disks 160 together. The modular pulley disks 160 can include a snap-fit joint 240 to assemble adjacent disks together to prevent relative rotation and distribute applied torque across the disk stack of the assembled pulley. The snap-fit joint 240 may be formed in the outer rim 180 of the modular pulley disks 160 and can be of a circular-socket design. As illustrated, a plurality of circular sockets 242 can be disposed into the outer rim 180 where the peripheral rim surface 182 and the first axial face 164 intersect with the plurality of sockets radially located around the axis line 138. Each socket 242 can include an inward circle 244 communicating with a narrow neck 246 that projects to the first axial face 164. A corresponding plurality of complementary shaped circular prongs 248 can project from the outer rim 180 where the peripheral rim surface 182 and the first axial face 164 intersect. The radial spacing and arrangement of the plurality of circular prongs 248 can correspond to that of the plurality of sockets 242. Thus, each modular pulley disk 160 includes a plurality of sockets 242 adjacent the first axial face and a complementary plurality of prongs 248 adjacent the second axial face 166. When the two modular pulley disks 160 are adjacent each other with the first and second axial faces 164, 166 in opposing contact, the plurality of circular prongs 248 can be forced into the plurality of sockets 242 and held by the neck 246. The modular pulley disks 160 are thus held in adjacent contact about the outer rims 180. Joining the modular pulley disks 160 at the outer rims 180 allows for greater frictional surface contact and torsional force transfer between adjacent disks. The non-metallic material used to manufacture the modular pulley disks 160 may allow relative deflection of the sockets 242 and/or prongs 248 to facilitate the snap fit joint 240. Other examples of snap fit joints 240 can include other shapes and configurations such as, for example, a cantilever snap joint.

Figure 10:
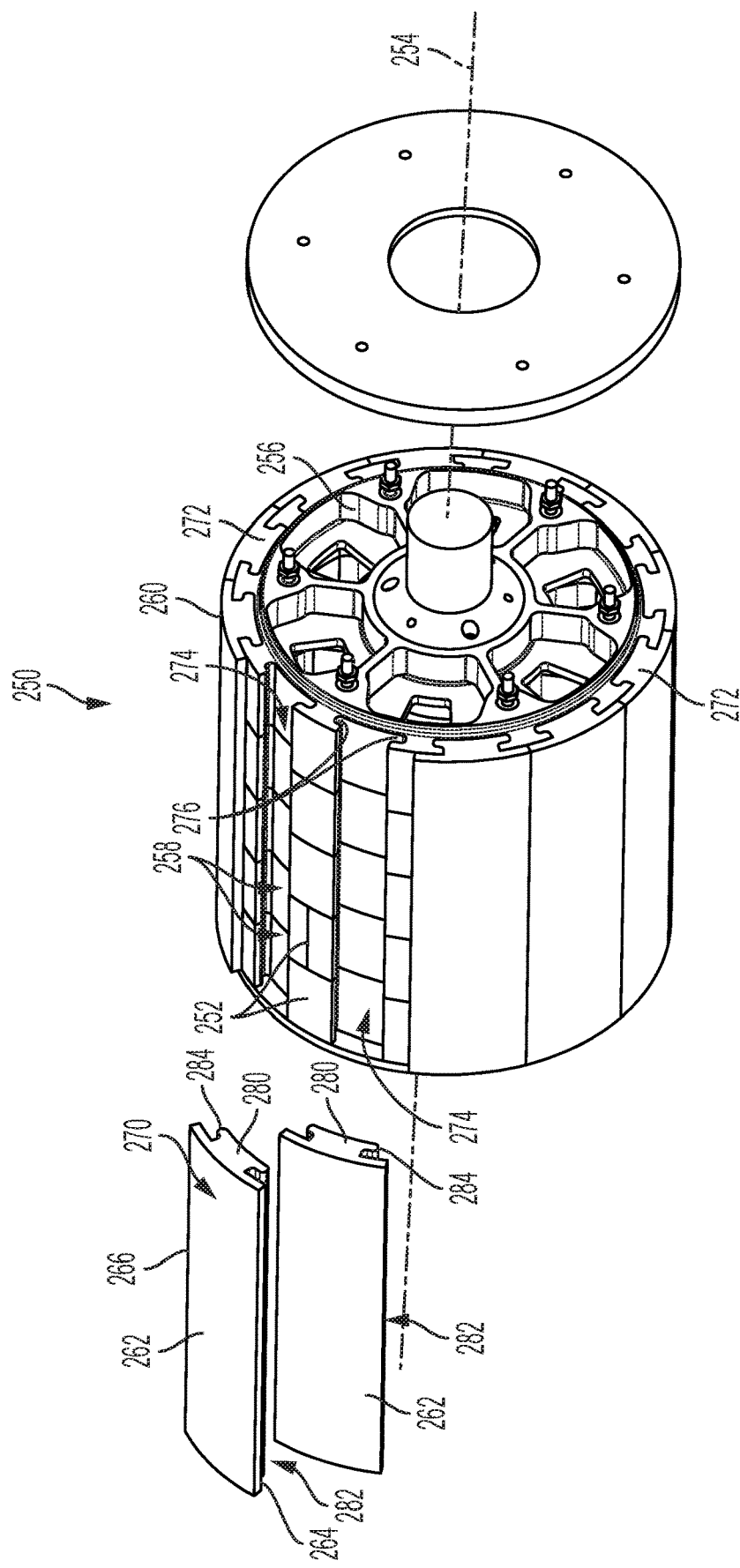
FIG. 10 is a perspective view of another example of a modular pulley assembly assembled from a plurality of modular pulley disks with an example of a pulley lagging assembled from a plurality of lagging bars disposed about the curvilinear pulley surface.
Figure 11:
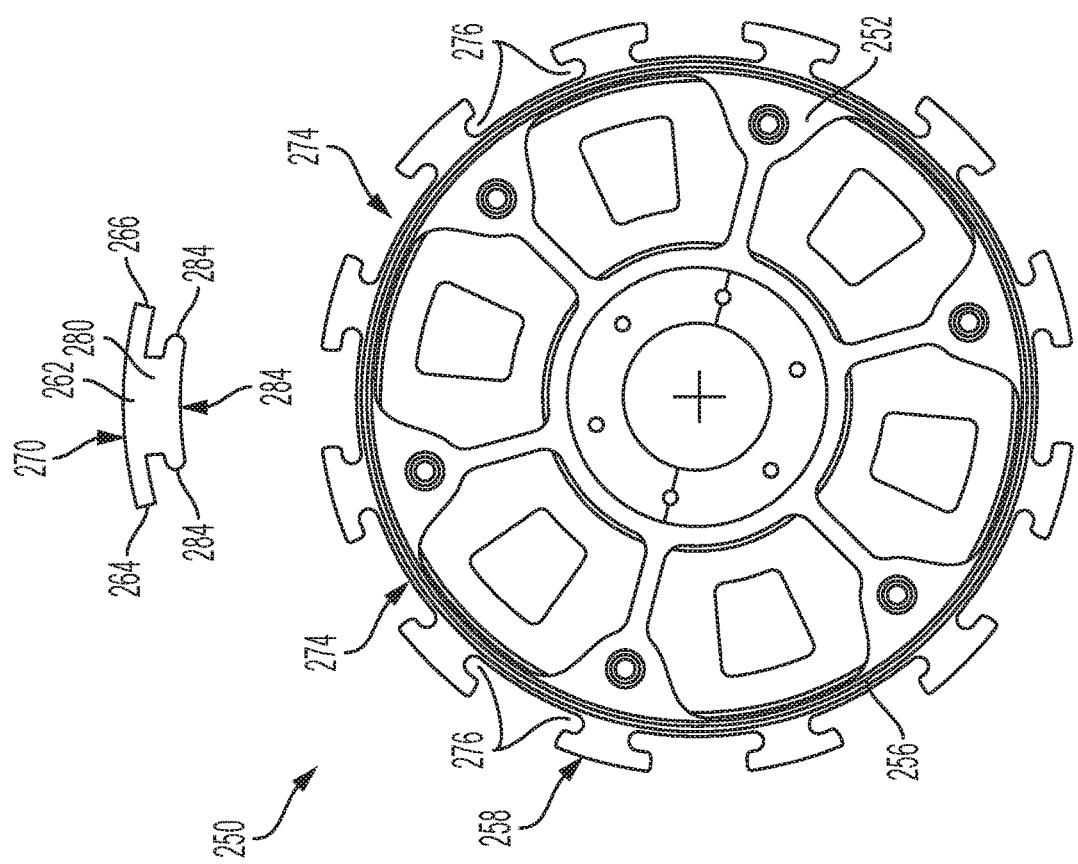
FIG. 11 is a front elevational view of the modular pulley assembly of FIG. 10 illustrating the lagging bar arranged to mate with a disk stack assembled from a plurality of modular pulley disks.

Referring to FIGS. 10 and 11, there is illustrated another example of a pulley 250 that can be assembled from a plurality of modular pulley disks 252. The modular pulley disks 252 can be annular in shape and can be made from a non-metallic material such as a molded polymer. The plurality of modular pulley disks 252 are arranged coaxially with respect to an axis line 254 such that they form a cylindrical body 256 corresponding to a disk stack of a desired length. Each of the modular pulley disks 252 includes a peripheral rim surface 258 that corresponds to and forms the cylindrical exterior of the cylindrical body 256. To enhance the traction between the outer cylindrical surface of the pulley 250 and the conveyor belt, the pulley 250 may include a pulley lagging 260 disposed around the cylindrical body 256. A pulley lagging 260 typically includes a different material such as a polymer or elastomer that may be wrapped around or otherwise secured to the pulley. The pulley lagging 260 may have a different coefficient of friction than the non-metallic material of the modular pulley disks 252 or may be knurled or have grooves formed therein to increase frictional contact with the belt during operation. In addition to improving traction, the pulley lagging 260 may also function as a protective surface and reduce abrasion between the pulley and the belt.

In the illustrated example, the pulley lagging 260 may be assembled from a plurality of arc-shaped lagging bars 262 that are circumferentially disposed around the cylindrical body 256. The number of lagging bars 262 can be selected based on the diameter of the pulley 250. The lagging bars 262 can have an axial length that is generally coextensive with the axial length of the cylindrical body 256 and can be shaped as a segment or arc having a diameter corresponding to the outer diameter of the cylindrical body 256. Each lagging bar 262 can include a first arc edge 264 and a second arc edge 266 corresponding to a width of the lagging bar and which has a curved shaped to conform to the cylindrical shape of the cylindrical body 256. In addition, the lagging bar 262 includes an exterior bar surface 270 that is intended to contact the conveyor belt and that may be manufactured from a material or include any suitable surface treatments to enhance traction with the belt.

The lagging bars 262 can be manufactured from any suitable material including a fiber composite material having fiber reinforcements disposed in a matrix. For example, the lagging bars 262 may be manufactured by a pultrusion process in which fiber filaments are unwound from a spool and directed through a liquid matrix such as polyester, polyurethane, epoxy or other resins, which is shaped by a heated die and cured. A possible advantage of the pultrusion process is that the fibers can be oriented in the lengthwise direction of the finished lagging bar 262 to improve stiffness in the assembled pulley lagging. The lagging bars 262 can be made from a multi-shot molding in which materials of different hardnesses are introduced to a common mold and the lagging bar has resulting layered configuration, for example, a harder core and a softer exterior to make frictional contact with the conveyor belt.

To secure the lagging bars 262 circumferentially around the cylindrical body 256 of the pulley 250, the lagging bars and the modular pulley disks 252 can include cooperative mating features in the form of structurally defined connections. For example, the mating features may include a sliding joint or prismatic joint 272 in which a portion of the lagging bar 262 slides with respect to and is received by a corresponding channel 274 disposed in the cylindrical body 256. In an example, the channels may be dovetail channels 274 that are located radially around the modular pulley disks 252 and that extend axially through the peripheral rim surface 258. The number of dovetail channels 274 may correspond to the number of lagging bars 262. The dovetail channels 274 can include two opposing tails 276 or slots that are disposed into the modular pulley disks 252 and are generally located below the peripheral rim surface 258 and a center slot 278 that is disposed through the peripheral rim surface and joins with the opposing tails 276. When the modular pulley disks 252 are assembled into the cylindrical body 256, the dovetail channels 274 of each disk can radially align with the dovetail channels in the adjacent disks so that the channels extend over the axial length of the cylindrical body. To mate with the dovetail channel 274, the lagging bar 262 can have a similar shaped mating profile 280 formed on its interior bar surface 282 opposite the exterior bar surface 270 which includes two oppositely directed pins 284 that can be received in the opposing tails 276 under the peripheral rim surface 258. The lagging bars 262 are linearly slid in the axial direction into the dovetail channels 274 and thereby secured to the cylindrical body 256 of the pulley 250. If the lagging bars 262 wear or become damaged, they can be removed from the dovetail channel 274 and replaced to refurbish the pulley 250. An additional advantage of attaching the lagging bars 262 with mating profiles 280 to the dovetail channels 274 of the cylindrical body 256 is that doing so assists in the maintaining the plurality of modular pulley disks 250 in abutting alignment. It will be appreciated that other examples of mating channels and profiles are contemplated and can be used to joined the lagging bars to the cylindrical body of the pulley.

Figure 12:
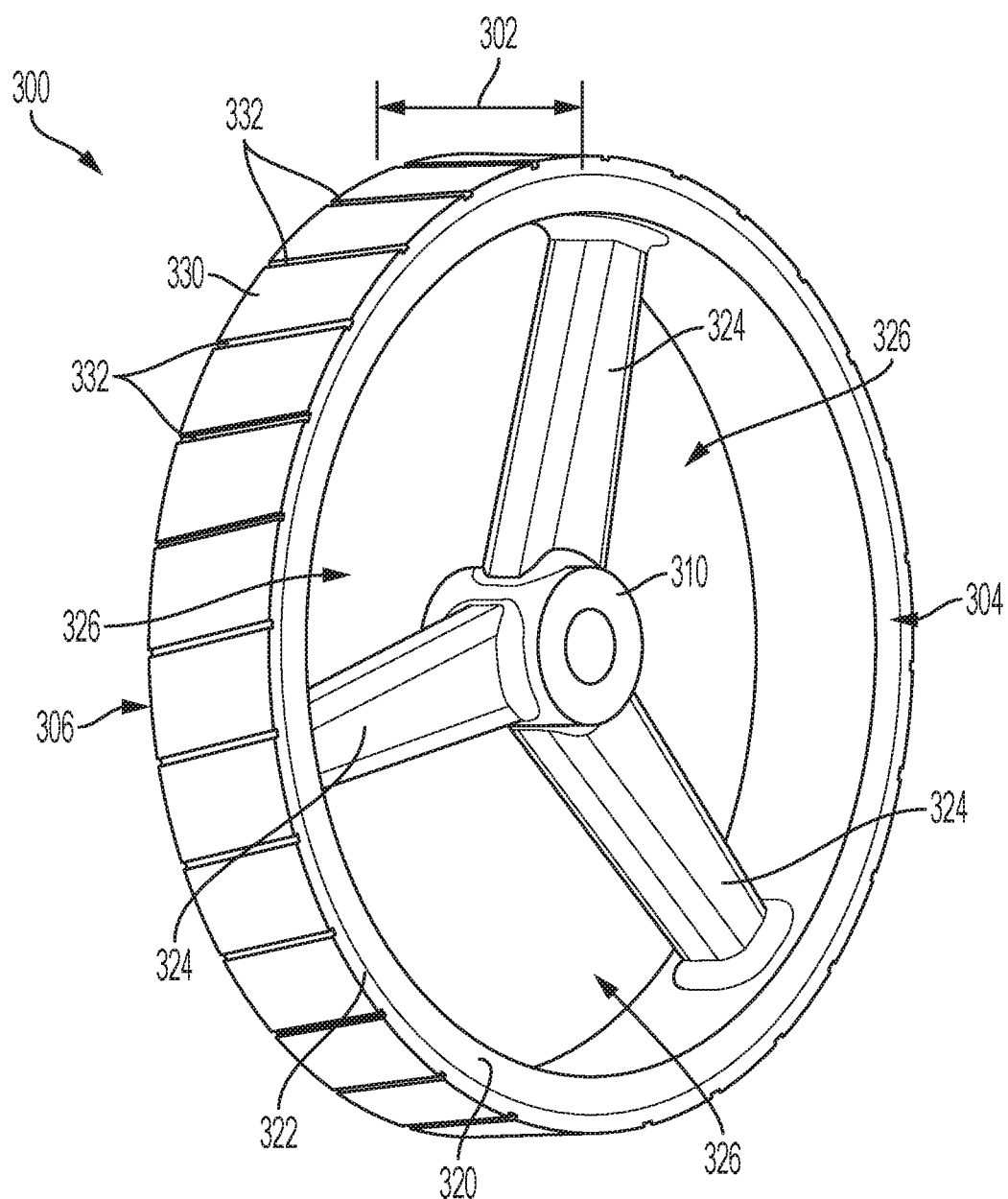
FIG. 12 is a perspective view of another example of a modular pulley disk with an example of a pulley lagging disposed about the curvilinear pulley surface in accordance with the disclosure.

Referring to FIG. 12, there is illustrated another example of a modular pulley disk 300 that can be assembled in an axially abutting relation to similar disks in a modular manner to form a cylindrical body of a modular pulley assembly. The modular pulley disk 300 also has a generally disk-like shape corresponding to the diameter of the pulley and can be made of a non-metallic material such as a polymer. The modular pulley disk 300 may have a disk width 302, defined between a first axial face 304 and an opposing second axial face 306, in which the disk width 302 corresponds to an axial segment of the overall pulley length. To ensure structural rigidity while reducing weight, the modular pulley disk 300 can have a generally opened construction including a central hub 310 and an annular, larger diameter outer rim 302 disposed concentrically about the hub. To accommodate the shaft, the central hub 310 may be annular in shape to define a shaft bore 312 therein. The central hub 310 can be keyed or otherwise set with respect to the support shaft in accordance with any of the techniques described herein.

The outer rim 320 can be a thin-walled annular shape extending between the first and second axial faces 302, 304 and may define a peripheral rim surface 322 corresponding to the diameter of the pulley and intended to physically contact the belt. To interconnect the central hub 310 and outer rim 320, a plurality of radial support spokes 324 can extend between the elements. Although the example illustrated in FIG. 12 shows three spokes 324, any suitable number of spokes can be included. The support spokes 324 can be rod-like structures and can be integrally formed with the central hub 310 and the outer rim 320, for example, by a molding process. The support spokes 324 can be radially equidistant from each other and can be separated by hollow cavities 326 disposed through the modular pulley disk 300. The cavities 326 therefore reduce component weight while the spokes 324 are desirably configured to transfer the compressive forces between the outer rim 320 and the central hub 310. The cavities 326 may be sized and shaped so that the assembled pulley is substantially hollow and further facilitate assembly of a plurality of modular pulley disks 300 in an axially stacked relation by, for example, providing physical and visual access openings into the cylinder body.

In the illustrated, the modular disk assembly 300 can have a pulley lagging 330 disposed about the peripheral rim surface 322 which may be molded thereon by an over-molding process and which may include features to improve traction with the conveyor belt. In the over-molding process, the central hub 310, outer rim 320 and plurality of support spokes 324 can be integrally cast as an initial substrate and in a second step the material for the pulley lagging 330 can be introduced to the mold and deposited on the peripheral rim surface 322. During the molding process, mold inserts may be selected to adjust the amount and thickness of the added material, thereby determining the outer diameter of the modular pulley disk 300 and thus the diameter of the modular pulley assembly. Thus, the same mold can be used to manufacture modular pulley disks 300 in various diameters per demand. The over-molding process also avoids having to use a secondary process to install the laggings. The pulley lagging 330 can also include features to improve interaction with the belt, such as a plurality of slits 332 or grooves formed therein that may increase friction with the belt and allow debris or material to be knocked off and directed away from the belt.

In a further example, instead of cooperative mating feature, the lagging bars 262 can be adhered to the curvilinear surface of the pulley body with adhesive or may be fastened thereto with fasteners. In another example, the pulley lagging may sheet of material that is wrapped around and bonded to the pulley body with adhesive.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A modular pulley assembly for a continuous conveyor comprising:
    a support shaft;
    a plurality of modular pulley disks adapted for coaxial alignment with each other to provide a generally cylindrical body with a curvilinear surface which a conveyor belt may wrap about, the plurality of modular pulley disks being selectively included to adjust the axial width of the cylindrical body, each modular pulley disk including a first axial face and a second axial face defining a disk width with the first axial face adapted to abut to the second axial face of an adjacent modular pulley disk when coaxially aligned in the cylindrical body,
    the modular pulley disks made of a nonmetallic material, and each modular pulley disk including a central hub having a shaft bore for receiving and forming a compression fit with a continuous shaft corresponding to the support shaft and an outer rim concentrically disposed around the central hub, wherein the central hub of each modular pulley disk includes a male protrusion protruding with respect to the first axial face and a female recess recessed with respect to the second axial face, the male protrusion matingly received in the female recess of an adjacent modular disk when coaxially aligned.

2. The modular pulley assembly of claim 1, wherein the plurality of modular pulley disks include a first group having a first disk width and second group having a second disk width, the first disk width larger than the second disk width.

3. The modular pulley assembly of claim 2, wherein modular pulley disks of the first group are located at respective first and second axial ends of the cylindrical body.

4. The modular pulley assembly of claim 1, wherein an internal bore surface of the shaft bore includes an elastomer to compressibly secure the modular pulley disk to the continuous shaft.

5. The modular pulley assembly of claim 4, wherein the central hub of each modular pulley disk includes a male protrusion protruding with respect to the first axial face and a female recess recessed with respect to the second axial face, the male protrusion matingly received in the female recess of an adjacent modular disk when coaxially aligned.

6. The modular pulley assembly of claim 5, wherein the male protrusion and the female recess have complementary frustoconical shapes concentrically disposed about the central shaft aperture.

7. The modular pulley assembly of claim 6, wherein the modular pulley disk includes plurality of support spokes radially extending between the central hub and the outer rim.

8. The modular pulley assembly of claim 7, wherein the plurality of support spokes are radially spaced apart from each other by respective cavities disposed in the modular pulley disk.

9. The modular pulley assembly of claim 8, comprising a thin-walled web extending across the cavities between the support spokes.

10. The modular pulley assembly of claim 9, further comprising a first end plate and a second end plate axially attached to a respective first and second axial ends of the cylindrical body.

11. The modular pulley assembly of claim 10, first comprising a plurality of tie rods extending between the first and second end plates to axially press the plurality of modular pulley disks together.

12. The modular pulley of claim 11, wherein the outer rim of each modular pulley disk includes a circular rabbet formed at the junction with the first axial face and a lip flange formed at the junction with the second face, the circular rabbet dimensioned to cooperatively form a lap joint with the lip flange.

13. A modular drive pulley assembly for a continuous conveyor comprising:
a support shaft;
a plurality of modular pulley disks adapted for coaxial alignment with each other to provide a generally cylindrical body with a curvilinear surface which a conveyor belt may wrap about, the plurality of modular pulley disks being selectively included to adjust the axial width of the cylindrical body,
the modular pulley disks made of a nonmetallic material, and each modular pulley disk including a central hub having a shaft bore for receiving and forming a compression fit directly with a continuous shaft corresponding to the support shaft and an outer rim concentrically disposed around the central hub.

14. A modular drive pulley assembly for a continuous conveyor comprising:
a support shaft;
a plurality of modular pulley disks adapted for coaxial alignment with each other to provide a generally cylindrical body with a curvilinear surface which a conveyor belt may wrap about, the plurality of modular pulley disks being selectively included to adjust the axial width of the cylindrical body,
the modular pulley disks made of a nonmetallic material, and each modular pulley disk including a central hub having a shaft bore for receiving and forming a compression fit with a continuous shaft corresponding to the support shaft and an outer rim concentrically disposed around the central hub,
wherein an internal bore of the shaft bore includes an elastomeric material to compressibly secure the modular pulley disk to the continuous shaft.

* * * * *